Sept. 8, 1942.   C. C. S. LE CLAIR   2,295,118
ELECTRICAL INDICATING APPARATUS
Filed April 18, 1940   2 Sheets-Sheet 1

Inventor
Camille Clare Sprankling LeClair
By Williams, Bradbury & Hinkle
Attys

Patented Sept. 8, 1942

2,295,118

UNITED STATES PATENT OFFICE 2,295,118

ELECTRICAL INDICATING APPARATUS

Camille Clare Sprankling Le Clair, Ealing, London, England, assignor to Tecalemit Limited, Brentford, Middlesex, England Application April 18, 1940, Serial No. 330,368
In Great Britain March 7, 1939

12 Claims. (Cl. 175—368)

This invention relates generally to electrical apparatus responsive to a succession of electrical impulses and has amongst its objects the provision of improved methods of and apparatus for indicating the frequency with which such impulses recur.

One object of the invention is to provide improved electrical apparatus for indicating the speed of movement of a moving member which is adapted to cause the emission of a series of electrical impulses at a frequency proportional to the speed of its movement.

A further object of the invention is to provide electrical apparatus for indicating the frequency of movement of a member, comprising in combination two parallel circuits adapted to be connected to a source of electric current, means for closing said circuits simultaneously to cause electrical impulses to be generated in both said circuits simultaneously, said means being operated periodically by said member, a heater element in one of said circuits, a constant period electrical relay included in the other circuit, and energized immediately the contact maker is closed, said relay having normally closed contacts included in the other circuit and adapted to be opened after a constant time lag to break the circuit through the heater element, and an indicating device associated with the heater element and including indicating means, the degree of movement of which is dependent upon the rate of supply of the said electrical impulses and, therefore, upon the frequency to be indicated.

A more specific object of the invention is to provide such electrical apparatus for indicating the rate of flow of liquid through a liquid meter.

In accordance with one feature of the invention, a thermocouple may be utilised and arranged to be heated by the electrical impulses whereby an electro-motive force is generated. The magnitude of this electro-motive force is dependent on the temperature to which the thermocouple is heated and, therefore, on the rate at which heat energy is supplied. The greater the number of impulses in a given time, and consequently the greater the rate of supply of energy, the higher will be the equilibrium temperature of the thermocouple, this being the temperature at which the energy supplied is balanced by the losses by radiation, conduction and by re-conversion into electrical energy. Thus, the potential generated by the thermocouple can be used as a measure of the frequency of the impulses, the thermal inertia of the thermocouple constituting a means for integrating the energy of the separate impulses.

The thermal constants of the thermocouple with its heater are so arranged that, although the impulses may arrive at relatively long intervals, the electromotive force generated does not fluctuate appreciably.

The indications of the thermocouple may be further steadied by the use of inherent damping in the instrument and the inertia of the parts of the latter.

It should be noted, however, that the rate of supply of energy to the thermocouple will only be proportional to the frequency of the recurrence of the impulses, provided that the energy of each of the impulses is always the same. In the ordinary way this may not always be so. Thus, in the case where a rotating member is caused to close a contact at each revolution, for example by means of a cam, the length, and consequently the electrical energy, of each impulse will be approximately inversely proportional to the speed of rotation of the member.

It is, accordingly, a further object of the invention to provide means for ensuring that the electrical impulses all have a substantially constant energy irrespective of their frequency.

Further objects of the invention will appear in the course of the following description.

One constructional form of the present invention, applied to apparatus for indicating the speed of rotation of the rotor of a liquid meter which operates in accordance with the rate of flow of the liquid through the meter, is shown on the accompanying drawings, whereon:

Figure 1:
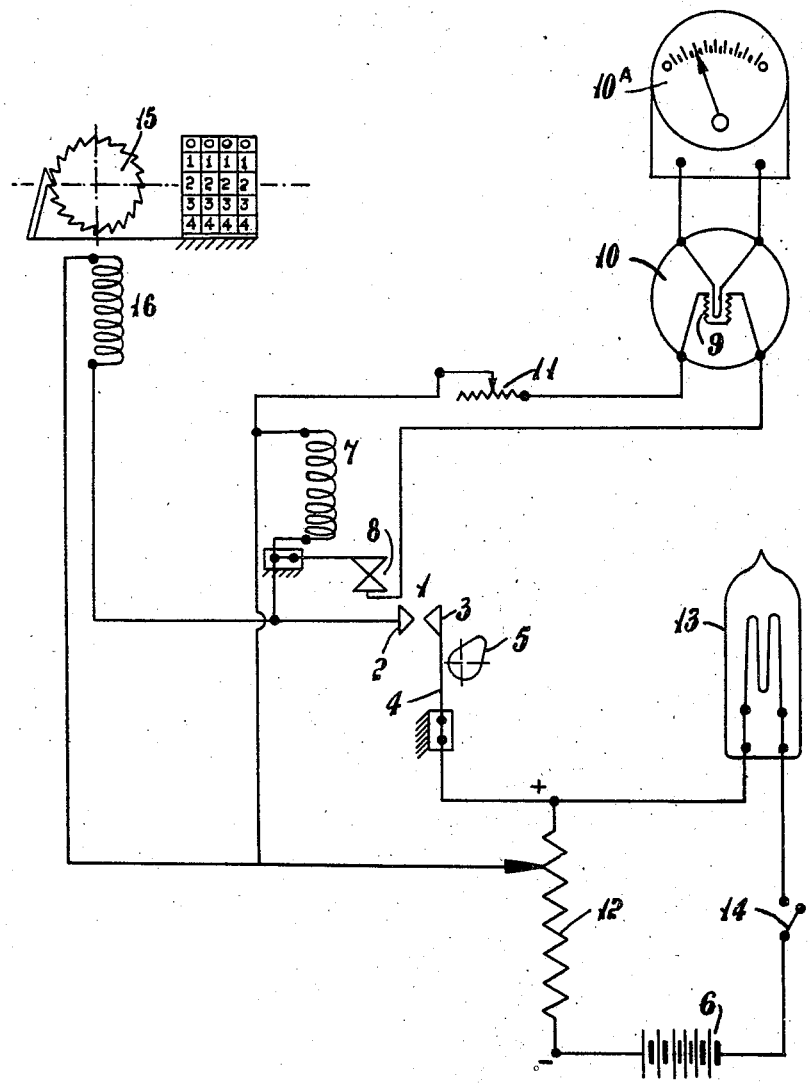
Figure 1 is a diagrammatic representation of the apparatus.

Referring first to Figure 1:

In this arrangement use is made of a contact maker 1 having a fixed contact 2, a movable contact 3 carried by a resilient arm 4 and a cam 5 driven from the liquid meter (not shown) and adapted to engage the contact arm at each revolution to cause the movable contact to engage the fixed contact. The speed of revolution of the cam, of course, depends upon the rate of flow of the liquid through the meter. In this construction, the movable contact 3 is connected to the positive pole of a source of current 6, while the other contact 2 is connected to the negative pole of this source through two parallel circuits.

One of these circuits includes the winding of a relay 7, while the other includes the normally closed contacts 8 of this relay and the heating element 9 associated with a thermocouple 10 which in this construction is arranged in an evacuated enclosure. The heating circuit also includes a variable resistance 11.

It is important that the voltage of the current source should remain accurately constant, while it is desirable that the current through the heater of the thermocouple should be accurately adjustable. This can be arranged conveniently if the potential is tapped off a potentiometer 12 connected in series with a battery or other electrical supply source 6 and with a barretter 13. A switch 14 is preferably included in the circuit to prevent wastage of current when the apparatus is not in use.

The relay 7 is so constructed as to have a relatively high speed of operation. In other words, the time lag between the moment when the relay is energised and when it opens its contacts 8 is small as compared with the time for which the contacts 2 and 3 of the contact maker remain closed, even at the highest operating speed of the member driving the cam 5. Moreover, this lag is arranged to be accurately constant for any given voltage applied to the relay winding.

When the device is in operation, the cam 5 rotates and closes the contact maker 1 which completes the two aforesaid parallel circuits, one through the normally closed contacts 8 of the relay 7 and through the heater 9 of the thermocouple, and the other through the winding of the relay 7. After a short inherent time lag the energisation of this winding causes the relay to operate to open its contacts 8 and break the circuit through the heater of the thermocouple, this occurring before further rotation of the cam 5 has allowed the contact maker 1 to open.

Thus, it will be seen that the duration of the electrical impulse supplied to the heater is quite independent of the speed of rotation of the cam and depends only on the constants of the relay and the potential applied across its winding. In practice, therefore, the energy supplied to the heater at each impulse is constant.

A sensitive milli-voltmeter 10A is connected to the thermocouple to measure the potential generated by the latter, which potential is dependent on the frequency of the impulses, and consequently on the speed of rotation of the liquid flow meter. If desired, the voltmeter may be calibrated to give a direct reading of the rate of flow of the liquid, either alone or in combination with the voltage indications.

It will be apparent, however, that in place of a visual indicator, such as a voltmeter, any other electrical or electro-mechanical device or apparatus which is responsive to the potential generated by the thermocouple may be connected to the latter and will then be responsive to the speed of rotation of the liquid meter and to changes in the rate of liquid flow.

If desired, the apparatus may also include an electro-magnetic counter or integrator 15, the circuit of the operating winding 16 of which may be taken from one end of the potentiometer through the contacts 2 and 3 of the contact maker 1 and back to the potentiometer. The counter may be of any suitable type.

The above construction is not limited to the used of a cam-operated contact maker, but any other suitable means may be used to provide what may be described as the primary electrical impulses.

It will be understood that the thermocouple need not be of the evacuated enclosure type. The thermal inertia of the hot junction of the thermocouple may be increased by the association therewith of suitable material adapted to store and emit heat energy, such as a metallic tube.

In any construction, such as that shown in Figure 1, in which a heater element, such as the heater 9, is employed, the heater may be arranged to convey heat to the bulb of a sensitive thermometer, which may be of the mercury, alcohol or other type, and which could be calibrated to give a direct reading of the frequency of movement of the member (or of the rate of flow of the liquid if the apparatus is applied to a liquid flow meter) either alone or in combination with temperature indications.

Figure 2:
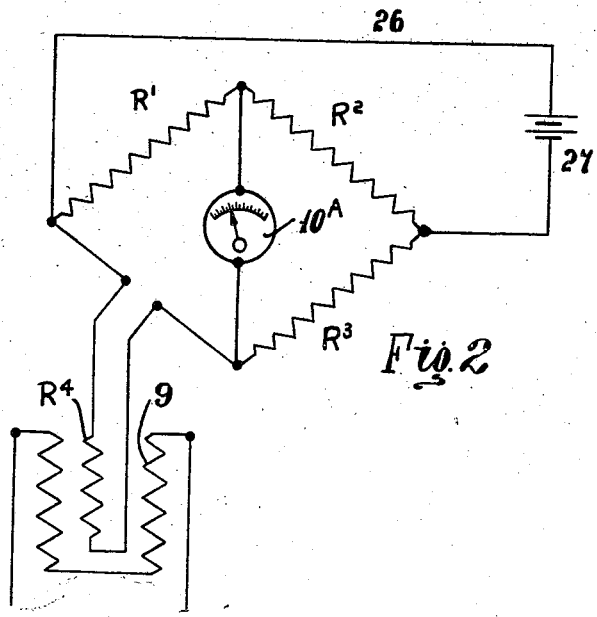
Figure 2 shows a modified indicating device applicable to a construction employing a heater element, such as that of Figure 1.

In the modified indicating device shown in Figure 2, use is made of a potentiometer indicated generally by the numeral 26, the potentiometer or bridge circuit including a source of electric supply 27, resistances, $R^1$, $R^2$, $R^3$ and $R^4$ and a sensitive galvanometer 10A. The resistance $R^4$ is electrically insulated from, but is adapted to be heated by the heater 9. The variation of the resistance $R^4$ is thus dependent upon the heat imparted to it by the heater 9 and, therefore, upon the frequency of the electrical impulses applied to the heater, the speed of rotation of the cam 5 and the rate of flow of the liquid through the meter. Variation of the heating of the resistance $R^4$ will thus result in the variation of the reading of the galvanometer 10A.

The constructional forms of the invention described above are all applied to liquid flow meters. It is to be clearly understood, however, that the invention is adapted to be used to indicate the frequency of movement of any moving element whether rotating, reciprocating or oscillating.

I claim:

1. Electrical apparatus for indicating the frequency of movement of a member, comprising in combination two parallel circuits adapted to be connected to a source of electric current, means for closing said circuits simultaneously to cause electrical impulses to be generated in both said circuits simultaneously, said means being operated periodically by said member, a heater element in one of said circuits, a constant period electrical relay included in the other circuit and energized immediately the contact maker is closed, said relay having normally closed contacts included in the other circuit and adapted to be opened after a constant time lag to break the circuit through the heater element, and an indicating device associated with the heater element and including indicating means, the degree of movement of which is dependent upon the rate of supply of the said electrical impulses and, therefore, upon the frequency to be indicated.

2. Apparatus as claimed in claim 1, wherein the said indicating device consists of a galvanometer adapted to be operated by the electromotive force generated by a thermocouple which is heated by said heater element.

3. Apparatus as claimed in claim 1, wherein said indicating device consists of a thermometer adapted to be heated by said heater element.

4. Apparatus as claimed in claim 1, wherein said indicating device consists of a galvanometer in a potentiometer circuit, which also comprises a source of supply of electric current, and a resistance element associated with, and adapted to be heated by, said heater element.

5. Electrical apparatus for indicating the frequency of movement of a member, comprising two parallel circuits, a contact maker for connecting both said circuits simultaneously to a source of electric current, so as to produce electrical impulses in said circuits, the movable contact of the contact maker being operated intermittently by said member, and a constant period electrical relay included in one of said circuits and energized immediately the contact maker is closed, said relay having normally closed contacts which are included in the other parallel circuit, in which latter is also included means responsive to a predetermined quantity of electrical energy caused to act in said means each time an electrical impulse is created when the relay is energized, and said contacts being opened after a constant time lag independent of the time during which the said contact maker is closed.

6. Electrical apparatus for indicating the frequency of movement of a member, comprising two parallel circuits, a contact maker for connecting both said circuits simultaneously to a source of electric current so as to produce electrical impulses in said circuits, the movable contact of the contact maker being operated intermittently by said member, and a constant period electrical relay included in one of said circuits and energized immediately the contact maker is closed, said relay having normally closed contacts which are included in the other parallel circuit, and are opened after a constant time lag independent of the time during which the said contact maker is closed, said other parallel circuit also including a heater element associated with a thermo-couple, means being connected to the latter which is responsive to the electromotive force generated by the thermo-couple and which is adapted to indicate the rate at which heat energy is supplied and therefore the frequency to be indicated.

7. Electrical apparatus for indicating the frequency of movement of a member, comprising two parallel circuits, a contact maker for connecting both said circuits simultaneously to a source of electric current so as to produce electrical impulses in said circuits, the movable contact of the contact maker being operated intermittently by said member, and a constant period electrical relay included in one of said circuits and energized immediately the contact maker is closed, said relay having normally closed contacts which are included in the other parallel circuit, and are opened after a constant time lag independent of the time during which the said contact maker is closed, said other parallel circuit also including a heater element associated with a resistance of a potentiometer circuit, which latter also comprises a battery or equivalent and a sensitive voltmeter for indicating the potential difference due to the heating of said resistance, the temperature to which the latter is raised being dependent upon the rate at which the electrical impulses are supplied to said heater element.

8. Apparatus as claimed in claim 6, wherein said means responsive to the electromotive force generated by the thermocouple consists of a voltmeter calibrated to give a direct reading of the frequency of movement of said member.

9. Apparatus as claimed in claim 6, wherein means are provided whereby the voltage of the source of electric current shall remain substantially constant.

10. Electrical apparatus for indicating the frequency of movement of a member, comprising an electric circuit, a constant period relay in said circuit, said relay comprising normally closed contacts adapted to be opened after a constant time lag from the energization of the relay, a second circuit in parallel with the first mentioned circuit and including said normally-closed contacts, switch means actuated periodically by said member and adapted to connect and disconnect both said circuits simultaneously to and from a source of electric current, said relay being energized immediately said switch means is operated to connect said circuits to said source, electrical impulses being produced in both said circuits simultaneously, means which are included in said circuit including said normally-closed contacts and are responsive to the predetermined quantities of electrical energy produced in said circuit by said electrical impulses, and an indicating device including indicating means for indicating the rate of supply of said quantities of energy and, therefore, the frequency of movement of said member.

11. Electrical apparatus as claimed in claim 10, wherein said means responsive to the predetermined quantities of electrical energy consists of a heater element associated with a thermocouple, and wherein said indicating device consists of a galvanometer responsive to the electromotive force generated by said thermo-couple.

12. Electrical apparatus as claimed in claim 10, wherein said means responsive to said predetermined quantities of electrical energy consists of a heater element, and wherein said indicating device consists of a galvanometer in a potentiometer circuit, which also includes a source of electric current, and a resistance associated with, and adapted to be heated by, said heater element.

CAMILLE CLARE SPRANKLING LE CLAIR.